W. FUHRMANN.
MITER BOX.
APPLICATION FILED MAR. 16, 1910.

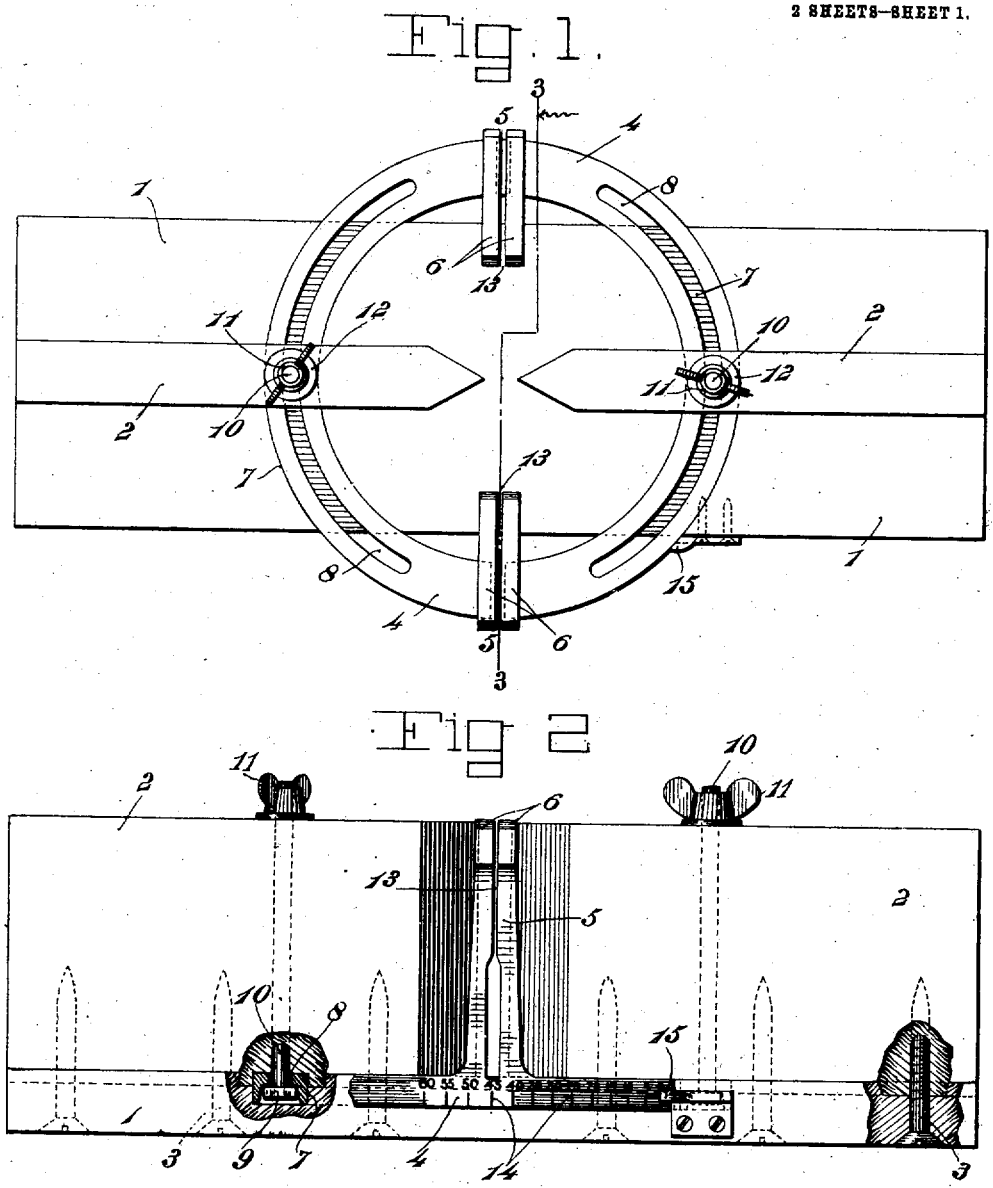

976,730.

Patented Nov. 22, 1910.
2 SHEETS—SHEET 2.

Witnesses
Harry King
V. B. Hillyard

Inventor
Warren Fuhrmann

By Victor J. Evans
Attorney

UNITED STATES PATENT OFFICE.

WARREN FUHRMANN, OF NEWARK, NEW JERSEY.

MITER-BOX.

976,730. Specification of Letters Patent. Patented Nov. 22, 1910.

Application filed March 16, 1910. Serial No. 549,697.

*To all whom it may concern:*

Be it known that I, WARREN FUHRMANN, a citizen of the United States, residing at Newark, in the county of Essex and State of New Jersey, have invented new and useful Improvements in Miter-Boxes, of which the following is a specification.

The present invention provides a device for the use of carpenters, joiners and mechanics requiring to cut material to various angles according to the special work in hand, the purpose being to provide an appliance of the nature aforesaid which may be quickly and accurately adjusted to any desired angle and firmly secured in the adjusted position and which will prevent injury to the teeth of the saw employed, whether said saw is of the ordinary cross-cut type or of the tenon or reinforced back variety.

The invention consists of the novel features, details of construction and combination of parts, which hereinafter will be more particularly set forth, illustrated in the accompanying drawings, and pointed out in the appended claims.

Figure 3:
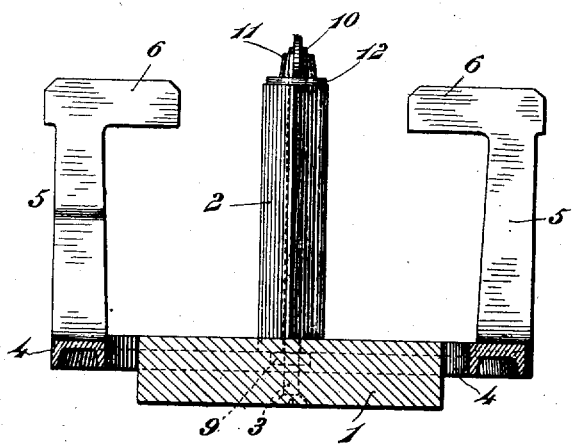
Figure 4:
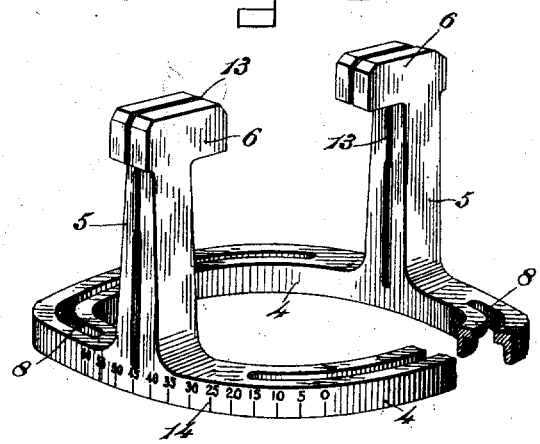

Referring to the drawings, forming a part of the application, Figure 1 is a top plan view of an appliance constructed in accordance with and embodying the essential features of the present invention. Fig. 2 is a side view of the appliance, parts being broken away. Fig. 3 is a transverse section on the line 3—3 of Fig. 1. Fig. 4 is a perspective view of the saw guide, a part of the ring being broken away.

Corresponding and like parts are referred to in the following description, and indicated in all the views of the drawings, by the same reference characters.

The appliance comprises a base 1, a work rest 2 extended upwardly from the base at a right angle, and a saw guide, the latter adjustable upon the base to any angular position. The base 1, as also the work rest 2, is usually of wood. In the present instance the work rest 2 is located intermediate of the longitudinal edges of the base 1 and is firmly attached at its lower edge thereto, preferably by means of wood screws or like fastenings 3. The work rest 2 comprises two parts of like formation and similar arrangement, the inner or opposing ends of the parts being separated and oppositely inclined to provide a space for the passage of the saw. By having the work rest mounted upon the base at a point between the longitudinal edges thereof a double miter box or appliance is provided, since the work to be cut may be placed upon the base on either side of the work rest. In order to secure a firm connection between the work rest and base the latter is formed in its upper side with a longitudinal groove or channel in which the lower edge of the work rest is fitted.

The saw guide consists of a ring 4 and oppositely disposed arms 5, the latter being provided at their upper ends with cross heads 6. The ring 4 is of uniform width and thickness and is snugly fitted in an approximately circular groove 7 formed in the upper side of the base 1. The circular groove 7 is of a width corresponding to the width of the ring and is of a depth corresponding with the thickness of the ring so that when the parts are assembled the upper side of the ring 4 comes flush with the upper side of the base 1. The ring 4 is retained in place by the work rest, which extends thereover. Circumferential slots 8 are formed in opposite side portions of the ring 4 and receive the heads 9 provided at the lower ends of bolts 10, which are mounted in vertical openings formed in the work rest. Thumb nuts 11 are mounted upon the upper threaded ends of the bolts 10, so as to be turned to tighten the ring 4 and secure the same when in an adjusted position. Washers 12 are interposed between the thumb nuts 11 and the upper edge of the work rest to sustain the wear. The ring 4 is hollow in its lower side, thereby making provision for receiving the heads 9 of the bolts or fastenings 10. This construction also admits of the ring being of light formation and embodying a minimum amount of metal consistent with strength. The arms 5 and cross heads 6 preferably form an integral part of the ring 4 and are slotted, as indicated at 13, to receive the saw blade. The lower portion of the slot in each of the arms 5 is widened to provide ample clearance for the saw teeth so as to prevent dulling the same.

From the foregoing it is obvious that the saw guide may be set with reference to the work rest to provide a cut of any angle. In order that the angle may be determined with accuracy and certainty a series of scale graduations 14 are provided about the outer edge of the ring 4 and an index 15 is secured to an edge of the base 1 to coöperate with the scale graduations 14. In assembling the parts the work rest 2 is located on a line corresponding with the diameter of the ring 4, so that various angles may be determined with precision upon opposite sides of the work rest. Upon loosening the thumb nuts 11 the grip of the bolts or fastenings 10 is relaxed upon the ring 4 and the latter may be adjusted and when adjusted is made secure by tightening the thumb nuts 11, as will be readily understood.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A miter box comprising a base, a ring seated upon the base and provided at opposite points with slotted arms forming saw guides, said ring having portions upon opposite sides of the arms circumferentially slotted, a work rest secured upon the base at a middle point and extending over the slotted portions of the ring, and headed fastenings mounted in the work rest and having their headed portions passing through the slotted portions of the ring and engaging the lower side thereof to secure the ring in an adjusted position.

2. The herein described miter box comprising a base having an approximately circular groove in its upper face, a ring fitted in said groove and provided at opposite points with arms terminating at their upper ends in cross heads, said arms and cross heads being provided with kerfs to receive a saw blade and the ring having portions upon opposite sides of the arms circumferentially slotted, a work rest secured upon the base and extending over the slotted portions of the ring, and bolts mounted in the work rest and passing through the slotted portions of the ring and having their heads engaging the under side of the ring.

In testimony whereof I affix my signature in presence of two witnesses.

WARREN FUHRMANN.

Witnesses:
ALEXANDER B. CASTNER,
MILLER C. DAVISON.